United States Patent
Baxter et al.

(10) Patent No.: US 10,717,666 B2
(45) Date of Patent: Jul. 21, 2020

(54) METHODS FOR SEPARATING NON-FIBROUS SOLIDS FROM LIQUIDS USING A DOUBLE-ROLLER

(71) Applicants: Larry Baxter, Orem, UT (US); Nathan Davis, Bountiful, UT (US)

(72) Inventors: Larry Baxter, Orem, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 235 days.

(21) Appl. No.: 15/588,136

(22) Filed: May 5, 2017

(65) Prior Publication Data
US 2018/0319691 A1 Nov. 8, 2018

(51) Int. Cl.
| | | |
|---|---|---|
| C02F 11/12 | (2019.01) | |
| B01D 21/01 | (2006.01) | |
| C02F 1/52 | (2006.01) | |
| C02F 11/121 | (2019.01) | |
| B01D 21/06 | (2006.01) | |
| B01D 21/24 | (2006.01) | |
| C02F 1/00 | (2006.01) | |

(52) U.S. Cl.
CPC ............ *C02F 11/121* (2013.01); *B01D 21/06* (2013.01); *B01D 21/14* (2013.01); *B01D 21/2405* (2013.01); *B01D 21/245* (2013.01); *B01D 21/2427* (2013.01); *C02F 1/004* (2013.01)

(58) Field of Classification Search
CPC ............................ B01D 33/646; C02F 11/123
See application file for complete search history.

(56) References Cited

U.S. PATENT DOCUMENTS

| | | | | |
|---|---|---|---|---|
| 2,152,667 A | * | 4/1939 | Rosenthal | C11B 1/10 422/273 |
| 3,429,442 A | * | 2/1969 | Svatopluk | B01D 21/00 210/202 |
| 4,452,699 A | * | 6/1984 | Suzuki | C02F 1/24 210/608 |
| 4,705,631 A | * | 11/1987 | Hautala | B01D 33/11 210/403 |
| 5,202,017 A | * | 4/1993 | Hunter | B01D 33/04 210/143 |
| 2013/0105409 A1 | * | 5/2013 | Houle | B01D 33/0361 210/770 |
| 2014/0091043 A1 | * | 4/2014 | DeWaard | B01D 33/073 210/744 |

* cited by examiner

*Primary Examiner* — Ryan B Huang

(57) ABSTRACT

A method for separating solids from liquids is disclosed. A double-roller system is provided. A process fluid is provided to the double-roller system. The process fluid comprises a suspended solid and a process liquid. The suspended solid comprises non-fibrous solid particles. A portion of the process fluid is compressed through the double-roller system to produce a compressed portion of the suspended solid. A product stream and a dilute fluid stream are separated. The product stream comprises a compressed portion of the suspended solid and a first portion of the process liquid. The dilute fluid stream comprises a second portion of the suspended solid and a second portion of the process liquid.

6 Claims, 7 Drawing Sheets

100

101
Provide a double-roller system.

102
Provide a process fluid to the double-roller system.

103
Compress a portion of the process fluid through the double-roller system.

104
Separate the resulting product stream and dilute fluid stream.

FIG. 1

METHODS FOR SEPARATING NON-FIBROUS SOLIDS FROM LIQUIDS USING A DOUBLE-ROLLER

This invention was made with government support under DE-FE0028697 awarded by The Department of Energy. The government has certain rights in the invention.

FIELD OF THE INVENTION

This invention relates generally to solid-liquid separations. More particularly, we are interested in separations of non-fibrous solids from liquids using a double-roller.

BACKGROUND

A double roller, or mangle, has been in use for many years in laundries. Even now, large, automated mangles are used for fabric dewatering. Double rollers of many types are used for removal of liquids from fibers, fabrics, and polymers. Mangles are ideally suited for removing liquids from materials like fibers, fabrics, and polymers due to their interlocked or interlocking nature. The materials either are or can form sheets, and the mangle can pull them in and push them through the rollers.

Double rollers are also used for crushing in industries like mineral processing, though these are not typically called mangles. Double rollers can be used to make briquettes by adding a binder to a powder and applying high pressures. In both cases, no solid-liquid separations occur.

Mangles would normally be avoided for separating liquids from non-fibrous particulates, such as crushed ores, solid precipitates, and frozen condensed gases, because these materials do not interlock and form the required interlocking sheets. However, while these may not interlock and form sheets, appropriately applied compression can cause them to compress, agglomerate, clump, fuse, sinter, or be pressed. With sufficient pressure, these can even be compressed sufficiently to drive liquids out of interstitial spaces and form briquettes or similar. A mangle or double roller system capable of separating liquids and solids in this manner is needed.

United States patent publication number 3562227, to Drusco, et al., teaches a process for separating polymerization solvent media from elastomeric polymers. After various chemical separation steps, the polymer is separated from the liquid phase by centrifuge or mangle, and the polymer is recycled. The present disclosure differs from this disclosure in that the solid-liquid separation involves removing polymers, an interlocking solid, from liquids. This disclosure is pertinent and may benefit from the devices disclosed herein and is hereby incorporated for reference in its entirety for all that it teaches.

United States patent publication number 1631423, to Anton, teaches a method for purifying iron scale. The iron scale and gangue material are passed through the double rollers. The rollers have rubber or other soft surface so that hard ores embed in them and do not fall onto the conveyor belt, iron scale crushes and passes through, and a blower blows away light particulates so that they leave the scale. The present disclosure differs from this disclosure in that only solid-solid separations are accomplished. This disclosure is pertinent and may benefit from the methods disclosed herein and is hereby incorporated for reference in its entirety for all that it teaches.

SUMMARY

A method for separating solids from liquids is disclosed. A double-roller system is provided. A process fluid is provided to the double-roller system. The process fluid comprises a suspended solid and a process liquid. The suspended solid comprises non-fibrous solid particles. A portion of the process fluid is compressed through the double-roller system to produce a compressed portion of the suspended solids. The product stream and a dilute fluid stream are separated. The product stream comprises the compressed portion of the suspended solid and a first portion of the process liquid. The dilute fluid stream comprises a second portion of the suspended solid and a second portion of the process liquid.

The compressing step may further comprise agglomerating, clumping, fusing, sintering, pressing, or combinations thereof the suspended solid into larger particles and reducing the process liquid from becoming bound in the pores in the larger particles.

The second portion of the process liquid may be essentially all of the process liquid.

The separating step may be accomplished in a thickener. An agglomerating agent, a flocculent, a binder, or a combination thereof may be provided to the process fluid before the compressing step. The separating step may be accomplished in a filtering device. For both thickeners and filter devices, the double-roller system may comprise a first roller and a second roller, wherein the first roller and the second roller comprise partially-interlocking teeth, wherein the suspended solid is compressed between the teeth of one roller and an outer surface of another roller. For both thickeners and filter devices, the double-roller system may comprise a first roller and a second roller, wherein the first roller comprises teeth and the second roller comprises concave pockets, the teeth interlocking with the pockets, wherein the suspended solid is compressed by the teeth of one roller in the pocket of another roller. The thickener may further comprise a cover such that the thickener is sealed and maintained at an elevated pressure.

The separating step may be accomplished by providing a tank with a plate, the tank containing the double-roller system with a first roller placed above a second roller and the plate extending from an edge of the second roller to outside the tank at an acute angle above horizontal, such that the product stream is pushed up the plate and out of the tank.

The double-roller system may comprise a first roller placed next to a second roller at a bottom outlet of a vessel. The vessel may further comprise a stilling zone such that the suspended solid settles to the bottom of the vessel above the rollers, the dilute fluid stream overflows from an overflow outlet, and the product stream is compressed through the double-roller system out of the vessel. The first roller and the second roller may comprise partially-interlocking teeth, wherein the suspended solid is compressed between the teeth of one roller and an outer surface of another roller. The first roller may comprise teeth and the second roller comprises concave pockets, the teeth interlocking with the pockets, wherein the suspended solid is compressed by the teeth of one roller in the pocket of another roller.

The process liquid may comprise water, brine solutions, hydrocarbons, organic solvents, liquid ammonia, liquid carbon dioxide, cryogenic liquids, or combinations thereof.

The suspended solid may comprise frozen carbon dioxide, frozen nitrogen oxide, frozen sulfur dioxide, frozen nitrogen dioxide, frozen sulfur trioxide, frozen hydrogen sulfide, frozen hydrogen cyanide, solid hydrocarbons, particulates, mercury, other heavy metals, soot, dust, inorganic ash components, biomass, precipitated salts, water ice, or combinations thereof.

The double-roller system may comprise rollers capable of compressing together with constant force or variable force.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1 shows a method for separating solids from liquids.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Referring to FIG. 1, a method for separating solids from liquids is shown at 100, as per one embodiment of the present invention. A double-roller system is provided 101. A process fluid comprising a suspended solid and a process liquid is provided to the double-roller system 102. A portion of the process fluid is compressed through the double-roller system to produce a compressed portion of the suspended solid 103. A product stream and a dilute fluid stream are separated 104. The product stream comprises the compressed portion of the suspended solid and a first portion of the process liquid. The dilute fluid stream comprises a second portion of the suspended solid and a second portion of the process liquid.

Figure 2:
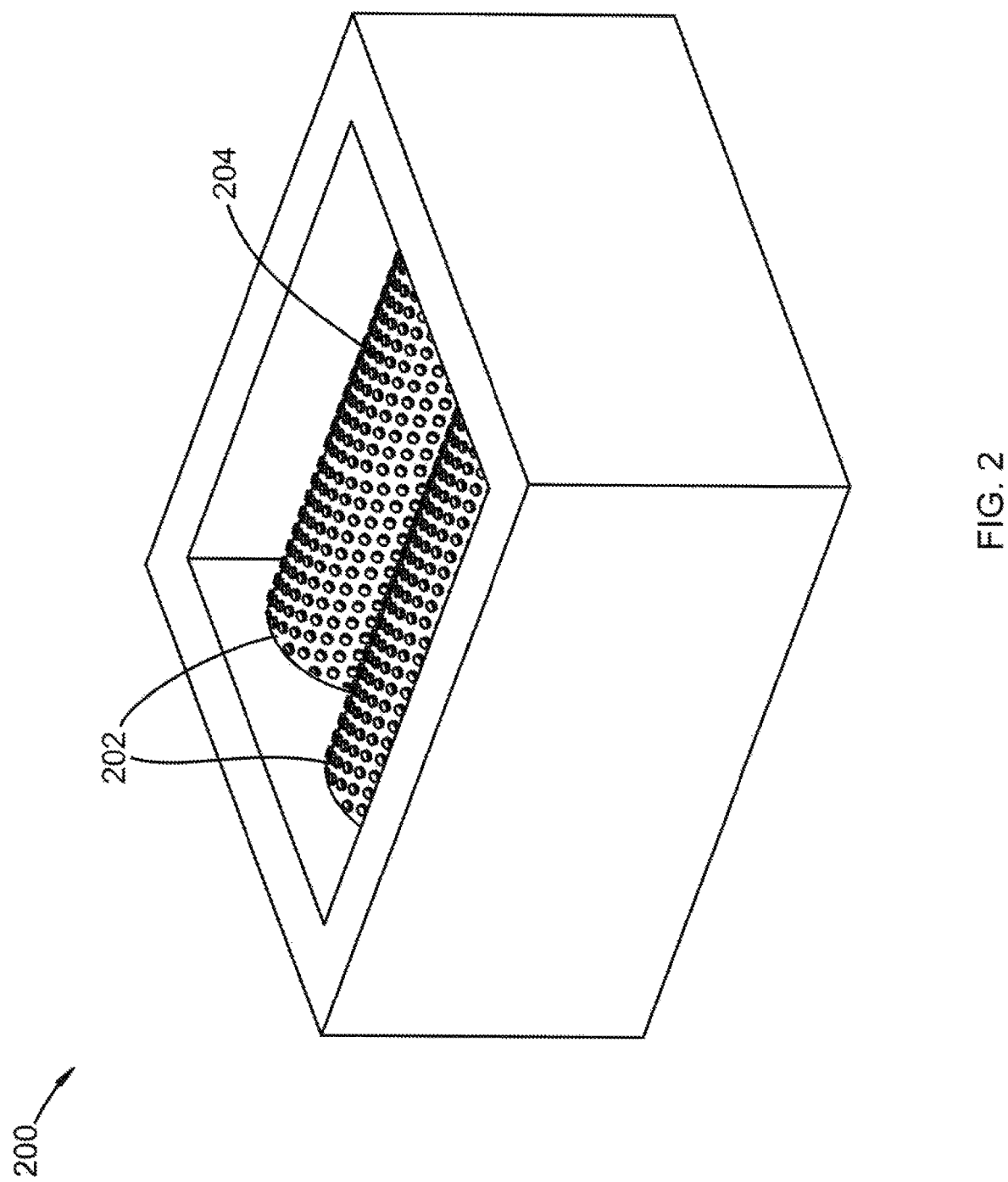
FIG. 2 shows a double-roller system.

Referring to FIG. 2, a double-roller system is shown at 200, as per one embodiment of the present invention. Two rollers 202 are provided with teeth 204. Two rollers 202 can be used in compressing a portion of the process fluid to produce a compressed portion of the suspended solid. In some embodiments, one of rollers 202 has pockets rather than teeth 204, and the pockets are aligned to teeth 204, allowing for focused compression of the portion of the process fluid in the pockets. In other embodiments, teeth 204 are removed and rollers 202 are smooth.

Figure 3:
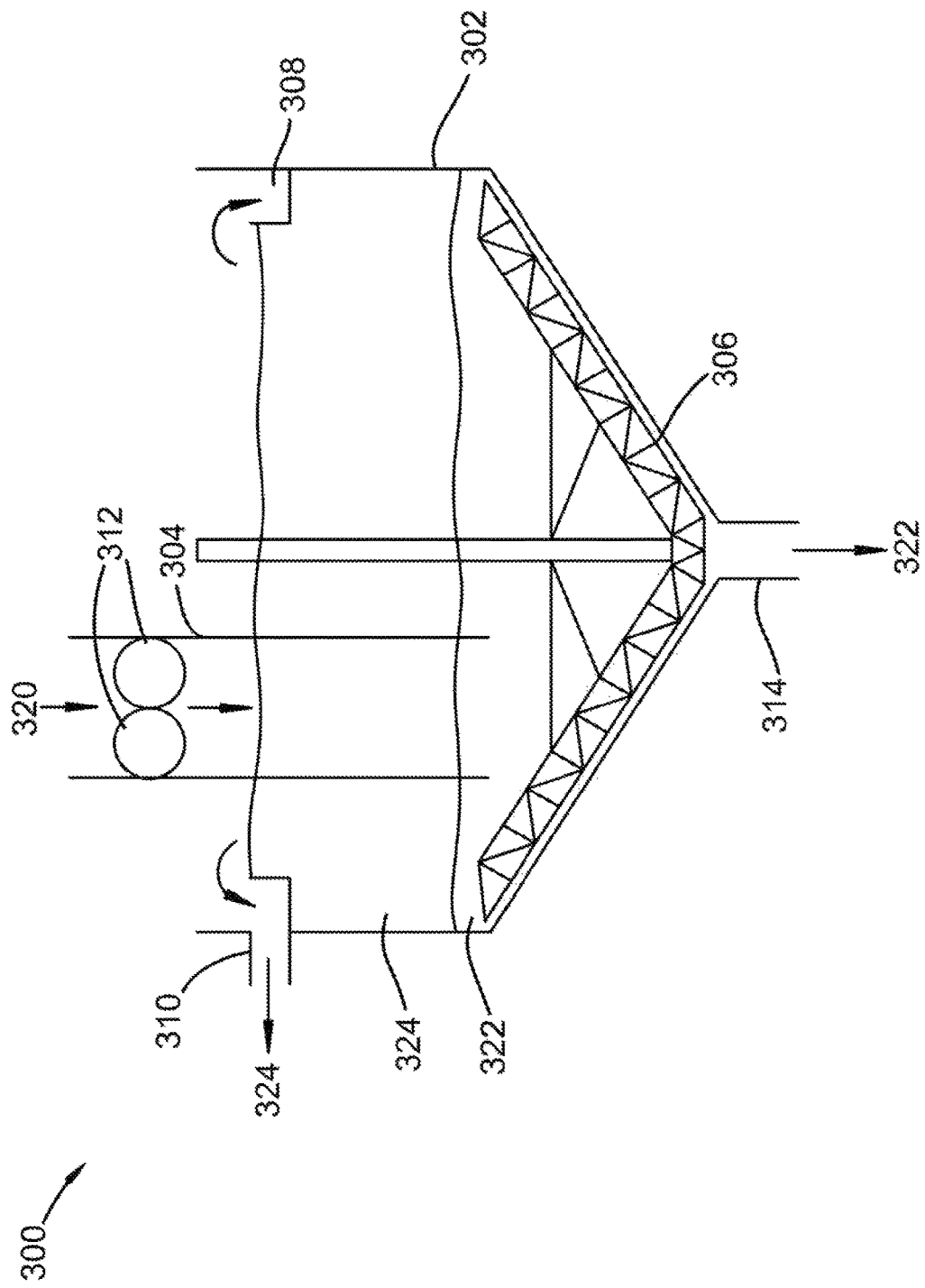
FIG. 3 shows a thickener with a double-roller system for separating solids from liquids.

Referring to FIG. 3, a thickener with a double-roller system for separating solids from liquids is shown at 300, as per one embodiment of the present invention. Thickener 302 comprises downcomer 304, rake 306, overflow weir 308, product outlet 314, and overflow outlet 310. Double-roller system 312 is situated in downcomer 304. Process fluid 320 comprises a process liquid and a suspended solid. Process fluid 320 is provided to downcomer 304 and is compressed through double-roller system 312, producing a compressed portion of the suspended solid and a solid-depleted process fluid, which is separated in thickener 302 into product stream 322 and dilute fluid stream 324. Product stream 322 passes through product outlet 314 while dilute fluid stream 324 overflows into overflow weir 308 and passes out through overflow outlet 310. In some embodiments, the compressed portion of the suspended solids agglomerate, clump, fuse, sinter, or become pressed to produce larger particles that exclude process liquid from becoming bound inside the larger particles. In some embodiments, an agglomerating agent, a flocculent, a binder, or a combination thereof are provided to the downcomer with process fluid 320. In some embodiments, double-roller system 312 comprises rollers with partially-interlocking teeth, wherein the suspended solid is compressed between the teeth of one roller and an outer surface of another roller. In other embodiments, double-roller system 312 comprises rollers where one roller comprises teeth and the other roller comprises concave pockets, the teeth interlocking with the pockets, wherein the suspended solid is compressed by the teeth of one roller in the pocket of another roller. In other embodiments, the thickener further comprises a cover such that the thickener is sealed and maintained at an elevated pressure.

Figure 4:
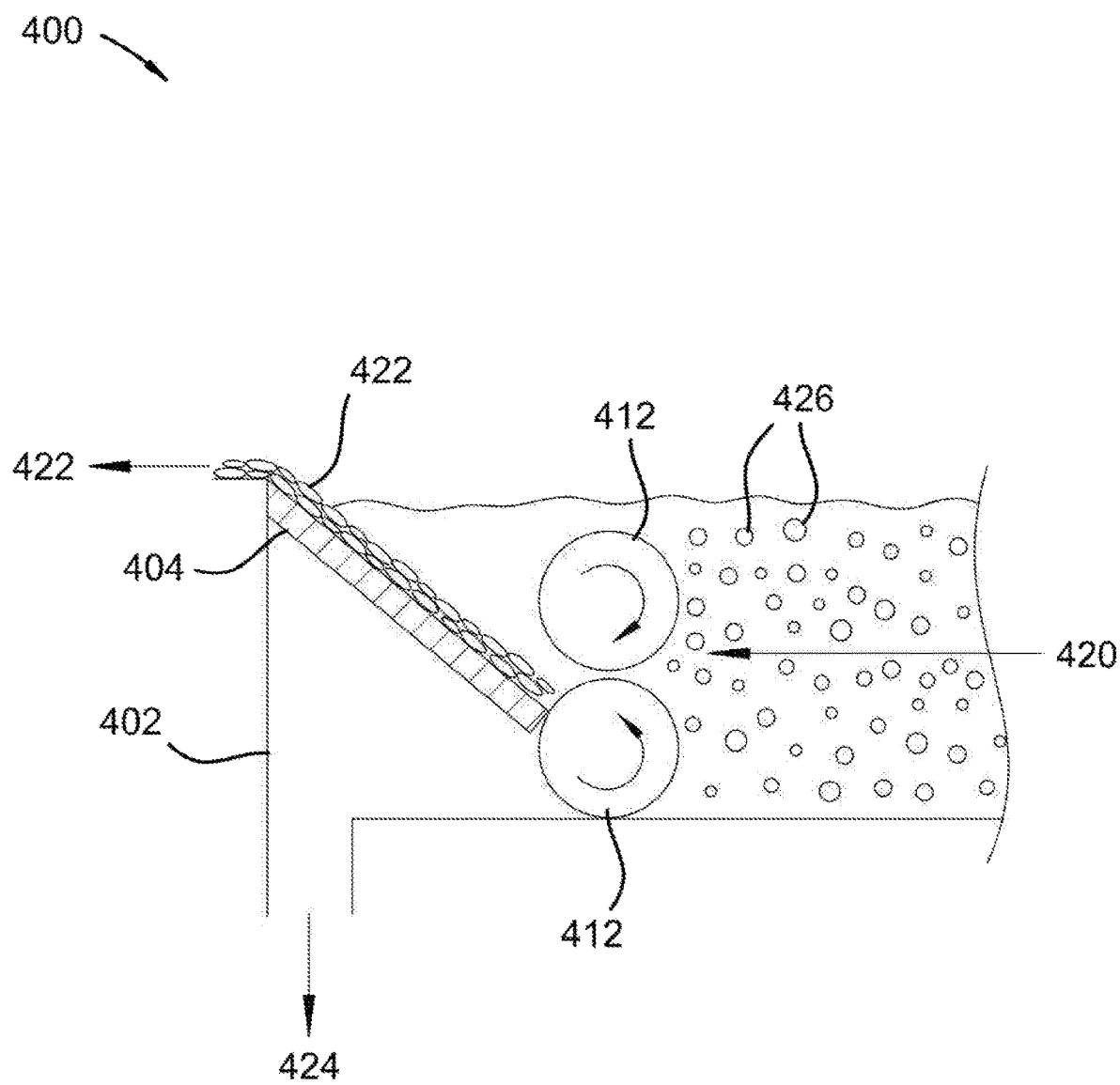
FIG. 4 shows a tank with a double-roller system for separating solids from liquids.

Referring to FIG. 4, a tank with a double-roller system for separating solids from liquids is shown at 400, as per one embodiment of the present invention. Tank 402 comprises plate 404, outlet 406, and double-roller system 412. Plate 404 is provided at an acute angle above horizontal, beginning at an edge of the bottom roller of double-roller system 412. Process fluid 420, comprising a process liquid and suspended solids 426, is provided to double-roller system 412, forming a compressed portion of suspended solids. The compressed portion of suspended solids is pushed up plate 404 and out of tank 402 with a small portion of the process liquid as product stream 422. The remainder of process fluid 420, comprising a large portion of the process liquid and a second portion of suspended solids, now dilute fluid stream 424, passes out of tank 402 through outlet 406. In some embodiments, plate 404 is porous. In some embodiments, plate 404 is a conveying device.

Figure 5:
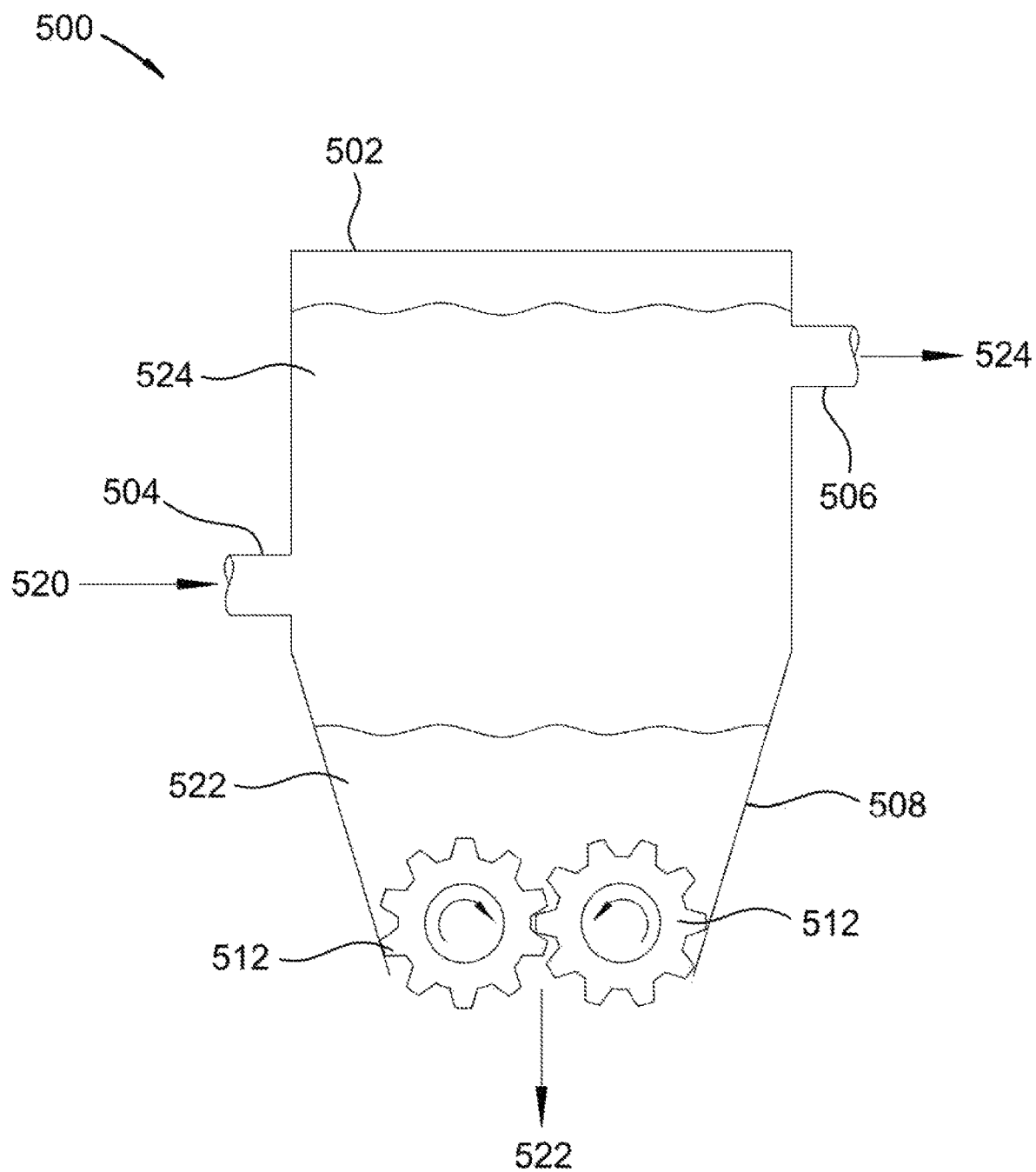
FIG. 5 shows a vessel with a double-roller system for separating solids from liquids.

Referring to FIG. 5, a vessel with a double-roller system for separating solids from liquids is shown at 500, as per one embodiment of the present invention. Vessel 502 comprises inlet 504, outlet 506, tapered section 508, and double-roller system 512. Vessel 502 is tall enough to provide a stilling zone, allowing for settling. Process fluid 520, comprising a process liquid and a suspended solid, is provided through inlet 504 to vessel 502. Process fluid 520 partially separates into product stream 522 and dilute fluid stream 524. Product stream 522, comprising a large portion of the suspended solids and a small portion of the process liquid, is compressed through double-roller 512. Product stream 522, now with a compressed portion of suspended solids, is then passed through a further separation process (not shown), resulting in a solid stream with essentially no process liquid. Dilute fluid stream 524 passes out of outlet 506. In some embodiments, double-roller system 512 comprises rollers with partially-interlocking teeth, wherein the suspended solid is compressed between the teeth of one roller and an outer surface of another roller. In other embodiments, double-roller system 512 comprises rollers where one roller comprises teeth and the other roller comprises concave pockets, the teeth interlocking with the pockets, wherein the suspended solid is compressed by the teeth of one roller in the pocket of another roller.

Figure 6:
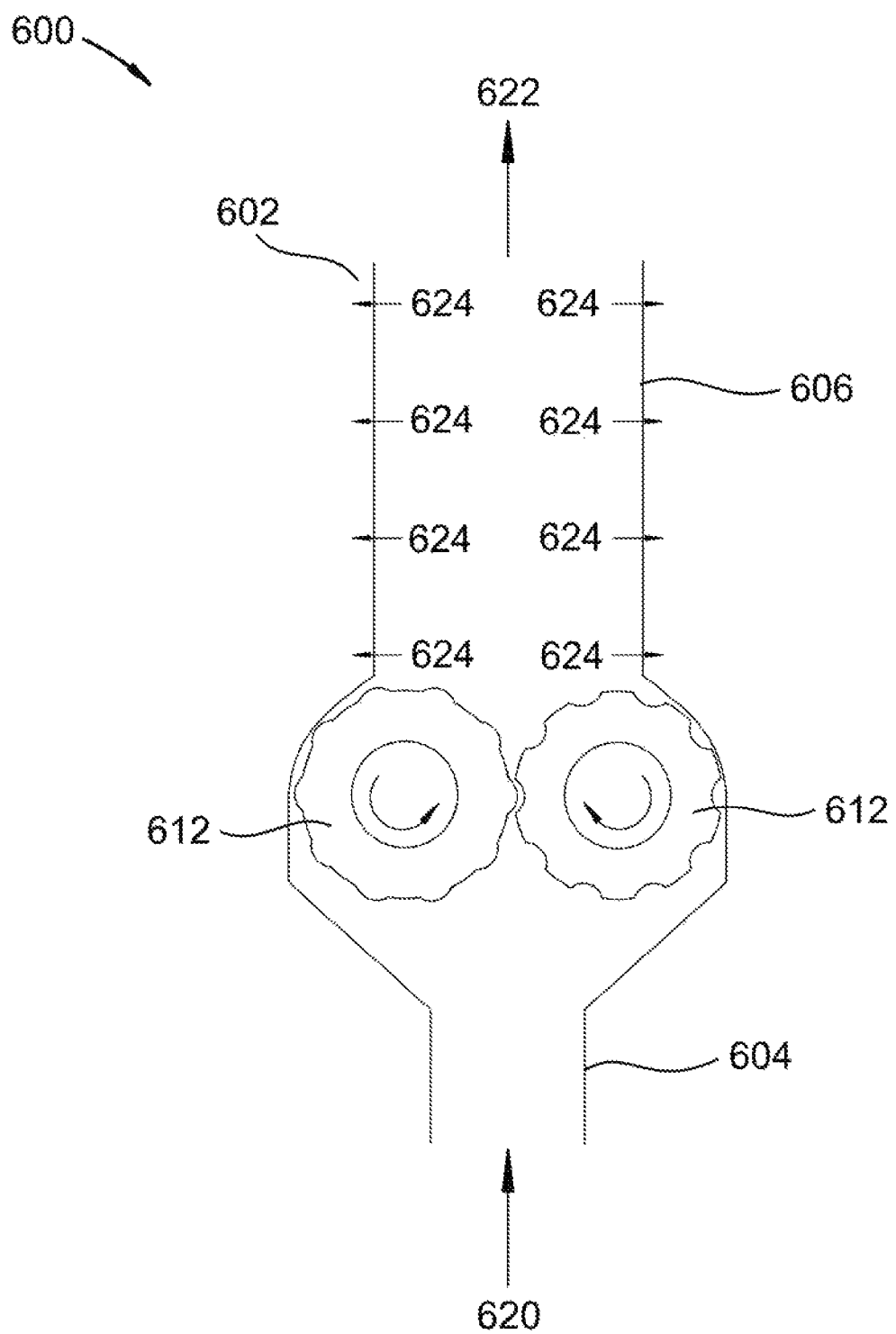
FIG. 6 shows a cross-flow filter with a double-roller system for separating solids from liquids.

Referring to FIG. 6, a cross-flow filter with a double-roller system for separating solids from liquids is shown at 600, as per one embodiment of the present invention. Process fluid 620, comprising a process liquid and a suspended solid, is provided to inlet pipe 604 and is compressed through double-roller system 612, producing a compressed portion of the suspended solid. A first roller of double-roller system 612 has teeth while the other has pockets. The teeth and pockets align, allowing for greater compression of the suspended solid. The compressed process fluid then passes through cross-flow filter 602, which has walls 606 that are porous. Dilute fluid stream 624, comprising a substantial portion of the process liquid and any of the suspended solid small enough, passes through walls 606. Product stream 622, comprising the remainder of the process liquid and the compressed portion of the suspended solid, leaves as a thickened sludge from cross-flow filter 602.

Figure 7:
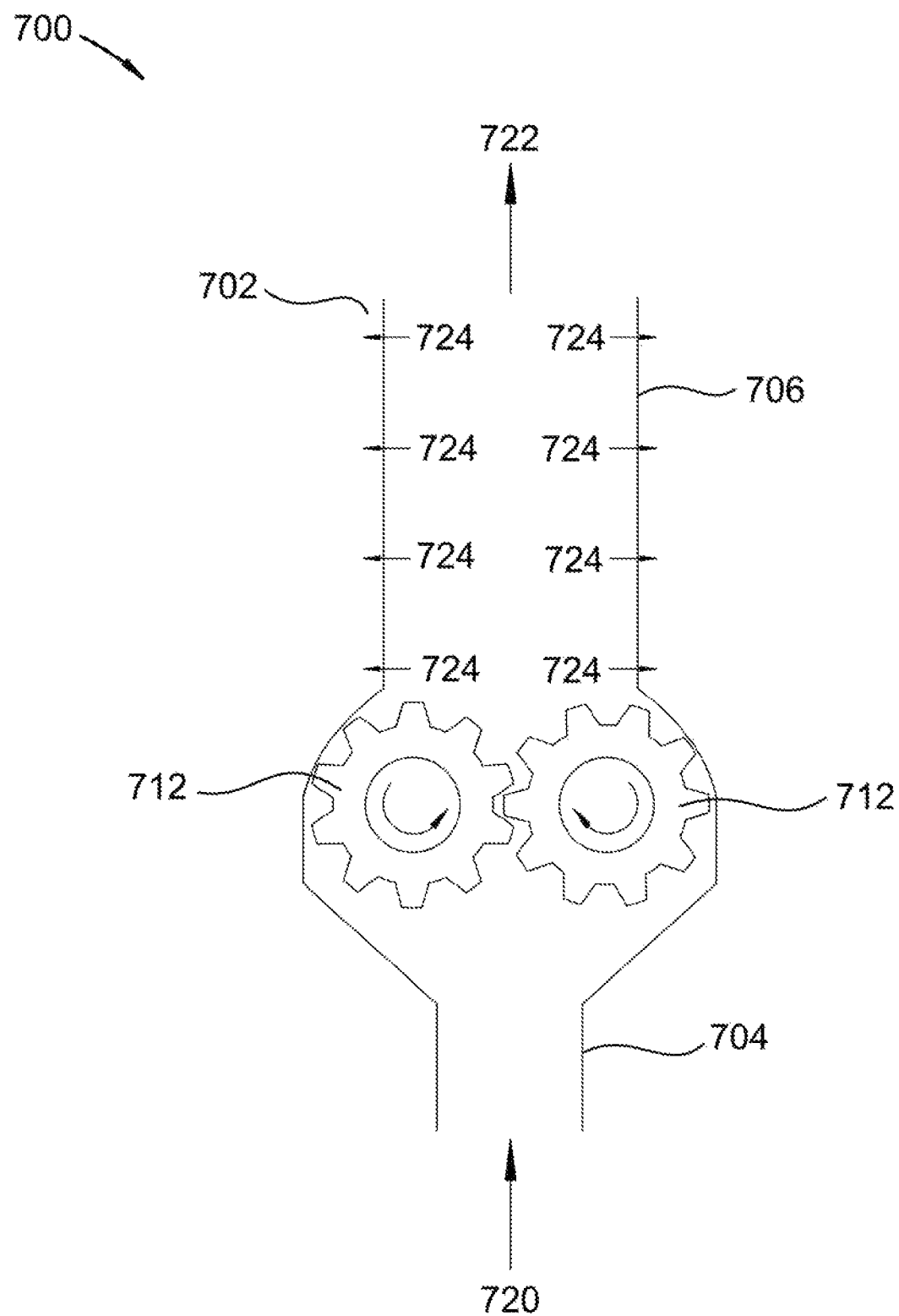
FIG. 7 shows a cross-flow filter with a double-roller system for separating solids from liquids.

Referring to FIG. 7, a cross-flow filter with a double-roller system for separating solids from liquids is shown at 700, as per one embodiment of the present invention. Process fluid 720, comprising a process liquid and a suspended solid, is provided to inlet pipe 704 and is compressed through double-roller system 712, producing a compressed portion of the suspended solid. The rollers of double-roller system 712 have teeth that align, allowing for greater compression of the suspended solid. The compressed process fluid then passes through cross-flow filter 702, which has walls 706 that are porous. Dilute fluid stream 724, comprising a substantial portion of the process liquid and any of the suspended solid small enough, passes through walls 706. Product stream 722, comprising the remainder of the process liquid and the compressed portion of the suspended solid, leaves as a thickened sludge from cross-flow filter 702.

In some embodiments, the process liquid comprises water, brine solutions, hydrocarbons, organic solvents, liquid ammonia, liquid carbon dioxide, cryogenic liquids, or combinations thereof.

In some embodiments, the suspended solid comprises frozen carbon dioxide, frozen nitrogen oxide, frozen sulfur dioxide, frozen nitrogen dioxide, frozen sulfur trioxide, frozen hydrogen sulfide, frozen hydrogen cyanide, solid hydrocarbons, particulates, mercury, other heavy metals, soot, dust, inorganic ash components, biomass, precipitated salts, water ice, or combinations thereof.

In some embodiments, the double-roller system comprises rollers capable of compressing together with constant force or variable force.

The invention claimed is:

1. A method for separating solids from liquids comprising:
   providing a double-roller system;
   providing a process fluid to the double-roller system, the process fluid comprising a suspended solid and a process liquid, the suspended solid comprising non-fibrous solid particles;
   compressing a portion of the process fluid through the double-roller system to produce a compressed portion of the suspended solid;
   separating a product stream and a dilute fluid stream by providing a tank with a plate, the tank containing the double-roller system completely submerged in the process liquid with a first roller placed above a second roller and the plate extending from an edge of the second roller to outside the tank at an acute angle above horizontal, such that the product stream is pushed up the plate by the first roller and the second roller and out of the tank, wherein:
   the product stream comprises the compressed portion of the suspended solid and a first portion of the process liquid;
   the dilute fluid stream comprises a second portion of the suspended solid and a second portion of the process liquid.

2. The method of claim 1, wherein the compressing step further comprises agglomerating, clumping, fusing, sintering, pressing, or combinations thereof the suspended solid into larger particles and reducing the process liquid from becoming bound in the pores in the larger particles.

3. The method of claim 2, wherein the second portion of the process liquid is essentially all of the process liquid.

4. The method of claim 1, providing the process liquid comprising water, brine solutions, hydrocarbons, organic solvents, liquid ammonia, liquid carbon dioxide, cryogenic liquids, or combinations thereof.

5. The method of claim 1, providing the suspended solid comprising frozen carbon dioxide, frozen nitrogen oxide, frozen sulfur dioxide, frozen nitrogen dioxide, frozen sulfur trioxide, frozen hydrogen sulfide, frozen hydrogen cyanide, solid hydrocarbons, particulates, mercury, other heavy metals, soot, dust, inorganic ash components, biomass, precipitated salts, water ice, or combinations thereof.

6. The method of claim 1, providing the double-roller system comprising rollers capable of compressing together with constant force or variable force.

\* \* \* \* \*